(12) United States Patent
Chang et al.

(10) Patent No.: US 12,223,761 B2
(45) Date of Patent: Feb. 11, 2025

(54) DISPLAY DEVICE AND FINGERPRINT SENSING CIRCUIT

(71) Applicant: HIMAX TECHNOLOGIES LIMITED, Tainan (TW)

(72) Inventors: Yaw-Guang Chang, Tainan (TW); Jia-Ming He, Tainan (TW); Zong-You Hou, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 407 days.

(21) Appl. No.: 17/929,748

(22) Filed: Sep. 5, 2022

(65) Prior Publication Data

US 2024/0078833 A1 Mar. 7, 2024

(51) Int. Cl.
*G06K 9/00* (2022.01)
*G06V 40/13* (2022.01)

(52) U.S. Cl.
CPC .................................. *G06V 40/13* (2022.01)

(58) Field of Classification Search
CPC .... G06V 40/13; G06V 40/1318; G06F 3/042; G06F 3/0412; G02F 1/13338; G02F 1/133514; G09G 3/36
See application file for complete search history.

(56) References Cited

U.S. PATENT DOCUMENTS

| | | | | |
|---|---|---|---|---|
| 7,545,350 | B2* | 6/2009 | Nakamura | G06F 3/0412 345/81 |
| 8,072,522 | B2* | 12/2011 | Taura | H04N 25/772 348/300 |
| 8,711,128 | B2* | 4/2014 | Small | G06F 3/0436 345/177 |
| 11,425,321 | B1* | 8/2022 | Wang | G06V 40/1318 |
| 11,842,560 | B1* | 12/2023 | Chang | G06V 40/1318 |
| 11,869,428 | B2* | 1/2024 | Kawashima | H10K 65/00 |
| 12,069,876 | B2* | 8/2024 | Kusunoki | G09F 9/30 |
| 12,080,095 | B2* | 9/2024 | Kawashima | H01L 27/146 |
| 2005/0179626 | A1* | 8/2005 | Yuki | G09G 3/3233 345/76 |
| 2020/0370953 | A1* | 11/2020 | Vu | G01J 1/32 |
| 2022/0058364 | A1* | 2/2022 | Wang | H04N 25/77 |

* cited by examiner

*Primary Examiner* — Shervin K Nakhjavan
(74) *Attorney, Agent, or Firm* — CKC & Partners Co., LLC

(57) ABSTRACT

The fingerprint sensing circuit includes a photo detector, a capacitor, a current mirror and a switch circuit. The capacitor has a first terminal electrically connected to the first terminal of the photo detector. The current mirror has an input terminal electrically connected to the first terminal of the photo detector and an output terminal electrically connected to a sensing line. In an exposure period, the switch circuit turns off the current mirror. In a sensing period, the switch circuit turns on the current mirror to generate a current on the sensing line, and the detecting circuit is configured to generate a fingerprint signal according to the current.

15 Claims, 7 Drawing Sheets

DISPLAY DEVICE AND FINGERPRINT SENSING CIRCUIT

FIELD OF INVENTION

The present invention relates to a display device using a photo detector to generate a current for recognizing fingerprint.

DESCRIPTION OF RELATED ART

There are some mobile phones or tablets on the market that have the function of fingerprint identification which can be optical type or capacitor type. In some devices, an optical fingerprint sensing circuit is set in a display area and connected to a detecting circuit outside the display area through wires. The detecting circuit generates a signal for fingerprint identification according to the voltage on the wires. However, the voltage on the wires may be disturbed by other signals in the display panel.

SUMMARY

Embodiments of the present disclosure provide a display device including a detecting circuit and a display panel. The display panel includes multiple pixel units and multiple fingerprint sensing circuits. Each of the fingerprint sensing circuits corresponds to at least one of the pixel units, electrically connected to the detecting circuit through a sensing line. Each fingerprint sensing circuit includes a photo detector, a capacitor, a current mirror and a switch circuit. The photo detector has a first terminal and a second terminal. The capacitor has a first terminal electrically connected to the first terminal of the photo detector. The current mirror has an input terminal electrically connected to the first terminal of the photo detector and an output terminal electrically connected to the sensing line. The switch circuit is configured to control the current mirror. In an exposure period, the switch circuit is configured to turn off the current mirror. In a sensing period, the switch circuit is configured to turn on the current mirror to generate a current on the sensing line, and the detecting circuit is configured to generate a fingerprint signal according to the current.

In some embodiments, the current mirror includes a first transistor and a second transistor. The first transistor has a first terminal electrically connected to a control terminal of the first transistor and the input terminal of the current mirror. The second transistor has a first terminal electrically connected to the output terminal of the current mirror. A control terminal of the second transistor is electrically connected to the control terminal of the first transistor. A second terminal of the second transistor is electrically connected to a second terminal of the first transistor and a system voltage.

In some embodiments, the switch circuit includes a first switch and a second switch. The first switch has a first terminal electrically connected to the input terminal of the current mirror and a second terminal electrically connected to the first terminal of the photo detector. The second switch has a first terminal electrically connected to the output terminal of the current mirror and a second terminal electrically connected to the sensing line.

In some embodiments, the switch circuit includes a switch having a first terminal electrically connected to the system voltage and a second terminal electrically connected to the second terminal of the first transistor and the second terminal of the second transistor.

In some embodiments, the second terminal of the photo detector is electrically connected to a bias voltage, and a second terminal of the capacitor is electrically connected to the bias voltage.

In some embodiments, the bias voltage is lower than the system voltage minus a threshold voltage of the first transistor.

In some embodiments, the detecting circuit includes an integrating circuit and an analog-to-digital converter. The integrating circuit has an input terminal electrically connected to the sensing line. The analog-to-digital converter has an input terminal electrically connected to an output terminal of the integrating circuit.

In some embodiments, the display panel further includes multiple color filters corresponding to the pixel units respectively. The color filters do not cover the photo detector of each of the fingerprint sensing circuits.

In some embodiments, the photo detector is a photo diode.

From another aspect, embodiments of the present disclosure provide a fingerprint sensing circuit disposed in a display panel and corresponding to at least one pixel unit of the display panel. The display panel includes a sensing line electrically connected to a detecting circuit. The fingerprint sensing circuit includes a photo detector, a capacitor, a current mirror and a switch circuit. The photo detector has a first terminal and a second terminal. The capacitor has a first terminal electrically connected to the first terminal of the photo detector. The current mirror has an input terminal electrically connected to the first terminal of the photo detector and an output terminal electrically connected to the sensing line. The switch circuit is configured to control the current mirror. In an exposure period, the switch circuit is configured to turn off the current mirror. In a sensing period, the switch circuit is configured to turn on the current mirror to generate a current on the sensing line, and the detecting circuit is configured to generate a fingerprint signal according to the current.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
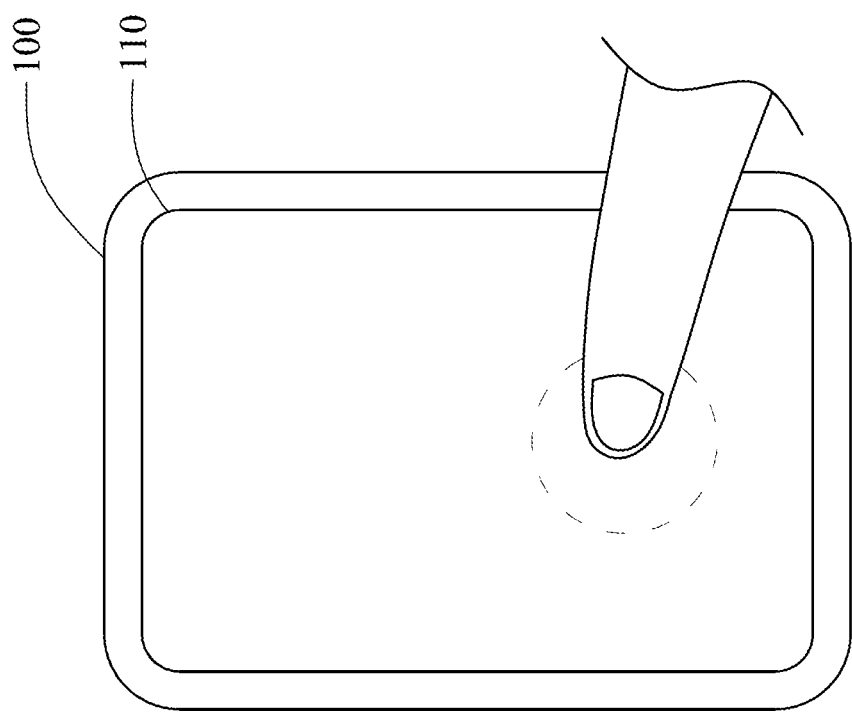
FIG. 1 is a schematic diagram showing the appearance of a display device in accordance with an embodiment.

FIG. 1 is a schematic diagram showing the appearance of a display device in accordance with an embodiment. Referring to FIG. 1, a display device 100 includes a display panel 110. A fingerprint sensing circuit is disposed in the display panel 110. The user may put his finger on a particular area of the display panel 110 for recognition his fingerprint. The display device 100 is a smart phone in this embodiment, but it can also be a tablet, a notebook computer, or a display screen which is not limited in the disclosure.

Figure 2:
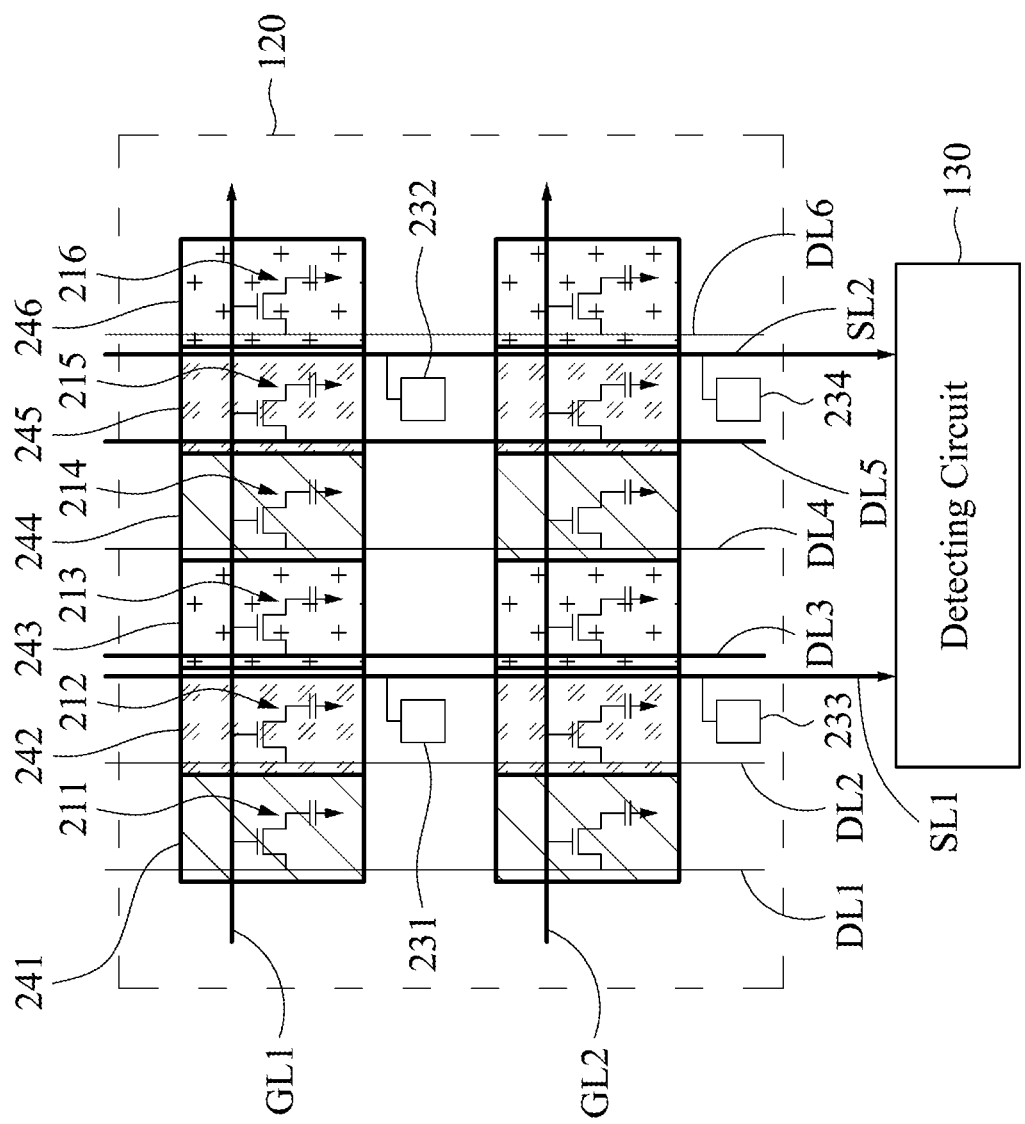
FIG. 2 is a schematic diagram of pixel structures in an area of the display panel in accordance with an embodiment.

FIG. 2 is a schematic diagram of pixel arrangement in an area of the display panel in accordance with an embodiment. Referring to FIG. 1 and FIG. 2, the display device 100 also includes a detecting circuit 130. The display panel 110 includes multiple pixel units (e.g. pixel units 211-216), fingerprint sensing circuits 231-234, multiple color filter (e.g. color filters 241-246), gate lines GL1-GL2, data lines DL1-DL6, and sensing lines SL1-SL2. The display panel 110 is a liquid crystal display panel in the embodiment, but it may also be an organic light-emitting diode (OLED) panel or a micro LED panel in other embodiments. Each of the pixel unit 211-216 includes a thin film transistor (TFT) and a pixel electrode. The gate of the TFT is connected to the corresponding gate line, the source of the TFT is electrically connected to the corresponding data line, and the drain of the TFT is electrically connected to the pixel electrode. The color filters 241-246 correspond to the pixel units 211-216 respectively in a sequence of red, green, and blue repeatedly. The display device also includes a backlight module 120 disposed underneath the display panel 110 for providing light. In the embodiment of the display panel 110 being the OLED panel, the light may be provided by the diodes without needing the backlight module 120. There are two rows of the pixel units in FIG. 2, and the fingerprint sensing circuits 231-232 are arranged between the two rows of the pixel units. Therefore, the color filters 241-246 do not cover the fingerprint sensing circuits 231-232. The fingerprint sensing circuits 231-232 are electrically connected to the detecting circuit 130 through the sensing lines SL1-SL2 respectively.

Figure 3:
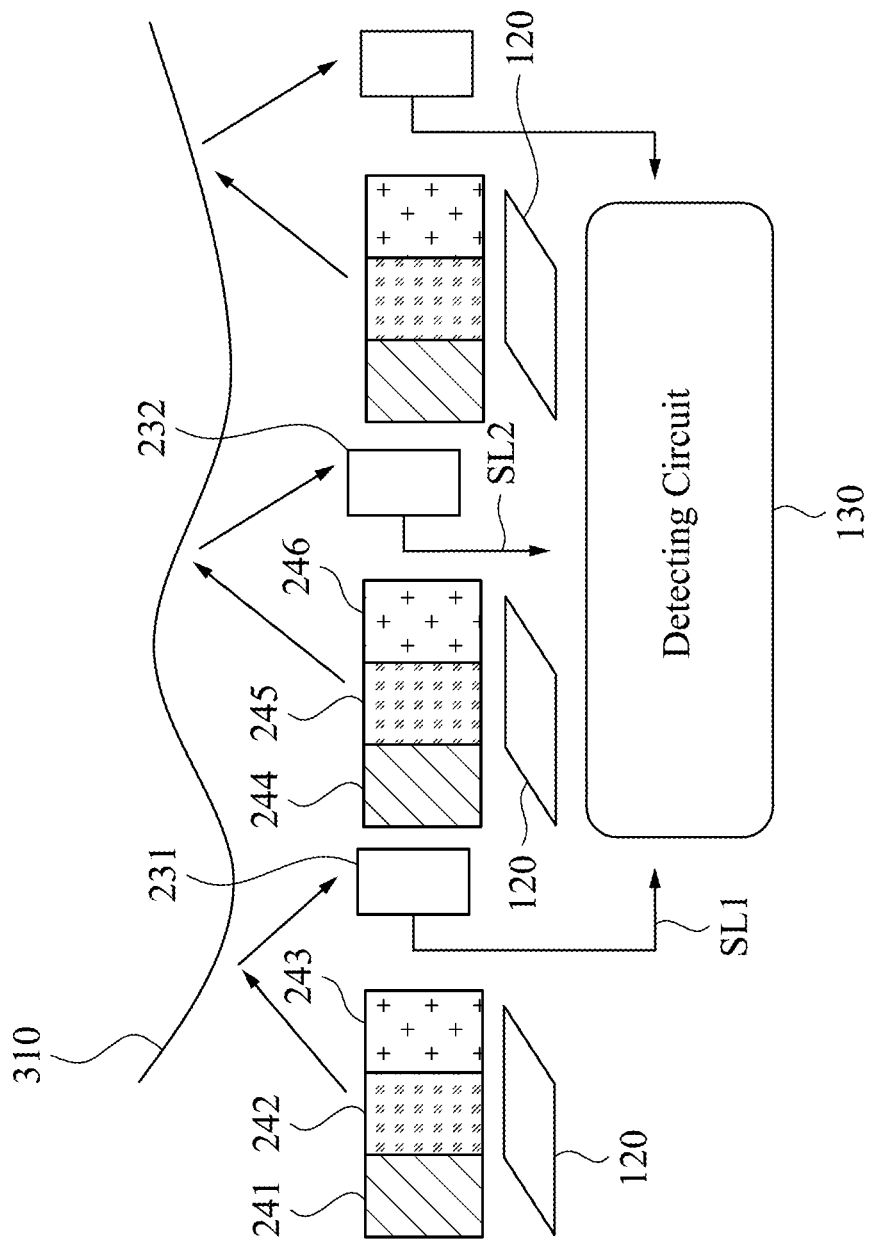
FIG. 3 is a diagram illustrating the scenario of recognizing the fingerprint.

FIG. 3 is a diagram illustrating the scenario of recognizing the fingerprint. Referring to FIG. 2 and FIG. 3, ridges and valleys of a finger 310 are to be sensed. The backlight module 120 provides light which passes through the color filters 241-246 and is reflected from the finger 310 to the fingerprint sensing circuits 231 and 232. The fingerprint sensing circuits 231 and 232 generate currents based on the intensity of the captured light in which the currents flow into the detecting circuit 130 through the sensing lines SL1 and SL2. The fingerprint sensing circuit 231 corresponds to the pixel units 211-213, and the fingerprint sensing circuit 232 corresponds to the pixel units 214-216. That is, each fingerprint sensing circuit corresponds to three pixel units because the red, green, and blue pixel units 211-213 are together provide white light. If the display panel includes white sub-pixels, then each white sub-pixel may correspond to one fingerprint sensing circuit in some embodiments. The fingerprint sensing circuits 231-234 are disposed in a particular area of the display panel in the embodiment, but they may be distributed on the whole display panel in other embodiments for recognizing fingerprint in any location of the display panel.

Figure 4:
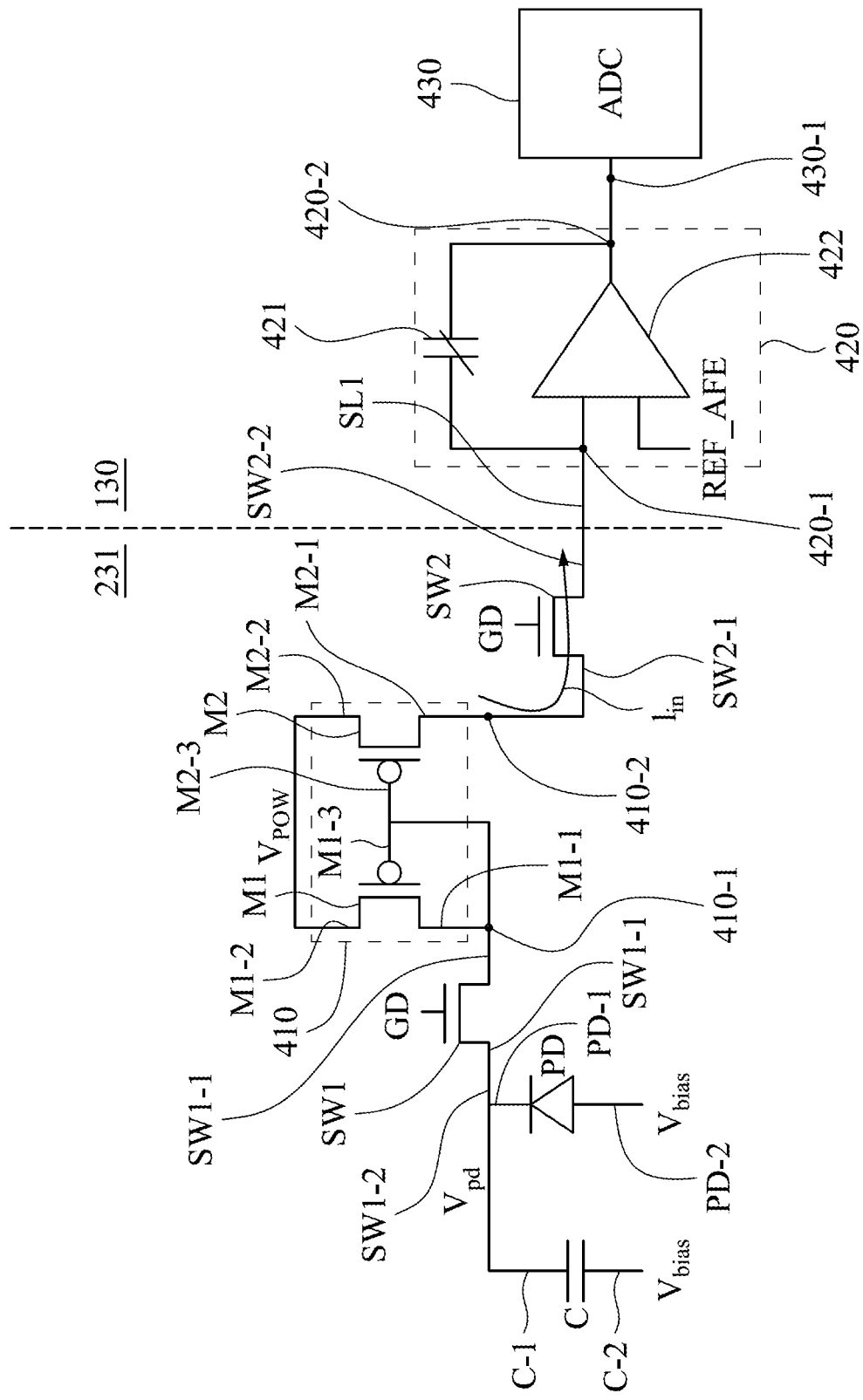
FIG. 4 is a circuit diagram of a fingerprint sensing circuit in accordance with an embodiment.

FIG. 4 is a circuit diagram of a fingerprint sensing circuit in accordance with an embodiment. The fingerprint sensing circuit includes a photo detector, a capacitor, a current mirror, and a switch circuit to form an active-pixel sensor (APS). The fingerprint is sensed based on a current that will not be easily affected by other signals in the display panel. The fingerprint sensing circuit 231 is taken as an example. The fingerprint sensing circuit 231 includes a photo detector PD, a capacitor C, a current mirror 410, and a switch circuit including a first switch SW1 and a second switch SW2 in the embodiment. The two switches SW1 and SW2 are controlled by a signal GD. The switch circuit is configured to control the current mirror 410. When the first switch SW1 and the second switch SW2 are turned on, the current mirror 410 is turned on; and when the first switch SW1 and the second switch SW2 are turned off, the current mirror 410 is turned off. The photo detector PD is, for example, a photo diode having a first terminal PD-1 and a second terminal PD-2. The capacitor C has a first terminal C-1 and a second terminal C-2. The first terminal C-1 of the capacitor C is electrically connected to the first terminal PD-1 of the photo detector PD. The second terminal C-2 of the capacitor C and the second terminal PD-2 of the photo detector PD are electrically connected to a bias voltage $V_{bias}$.

The first switch SW1 has a first terminal SW1-1 and a second terminal SW1-2 in which the first terminal SW1-1 is electrically connected to an input terminal 410-1 of the current mirror 410, and the second terminal SW1-2 is electrically connected to the first terminal PD-1 of the photo detector PD. In other words, the input terminal 410-1 of the current mirror 410 is electrically connected to the first terminal PD-1 of the photo detector PD through the first switch SW1. An output terminal 410-2 of the current mirror 410 is electrically connected to the sensing line SL1 thorough the second switch SW2. To be specific, the second switch SW2 has a first terminal SW2-1 and a second terminal SW2-2 in which the first terminal SW2-1 is electrically connected to the output terminal 410-2 of the current mirror 410, and the second terminal SW2-2 is electrically connected to the sensing line SL1.

The current mirror 410 includes a first transistor M1 and a second transistor M2 in the embodiment. A first terminal M1-1 of the first transistor M1 is electrically connected to the input terminal 410-1 of the current mirror 410. A second terminal M1-2 of the first transistor M1 is electrically connected to a system voltage $V_{POW}$. A control terminal M1-3 of the first transistor M1 is electrically connected to the first terminal M1-1. A first terminal M2-1 of the second transistor M2 is electrically connected to the output terminal 410-2 of the current mirror 410. A second terminal M2-2 of the second transistor M2 is electrically connected to the system voltage $V_{POW}$ and the first terminal M1-1 of the first transistor M1. A control terminal M2-3 of the second transistor M2 is electrically connected to the control terminal M1-3 of the first transistor M1. The transfer ratio of the current mirror 410 is greater than 1 for amplifying the current of the photo detector PD because it is generally too small to sense precisely. In other embodiments, the current mirror 410 may be Wilson mirror or any other types of current mirror which is not limited in the disclosure.

The detecting circuit 130 includes an integrating circuit 420 and an analog-to-digital converter (ADC) 430. The integrating circuit 420 includes a variable capacitor 421 and an amplifier 422. A first terminal of the variable capacitor 421 is electrically connected to a first input terminal of the amplifier 422. A second terminal of the variable capacitor 421 is electrically connected to an output terminal of the amplifier 422. The first input terminal of the amplifier 422 is electrically connected to an input terminal 420-1 of the integrating circuit 420 and the sensing line SL1. A second input terminal of the amplifier 422 is electrically connected to a reference voltage REF_AFE. An input terminal 430-1 of the analog-to-digital converter 430 is electrically connected to an output terminal 420-2 of the integrating circuit 420 (i.e. the output terminal of the amplifier 422).

Figure 5:
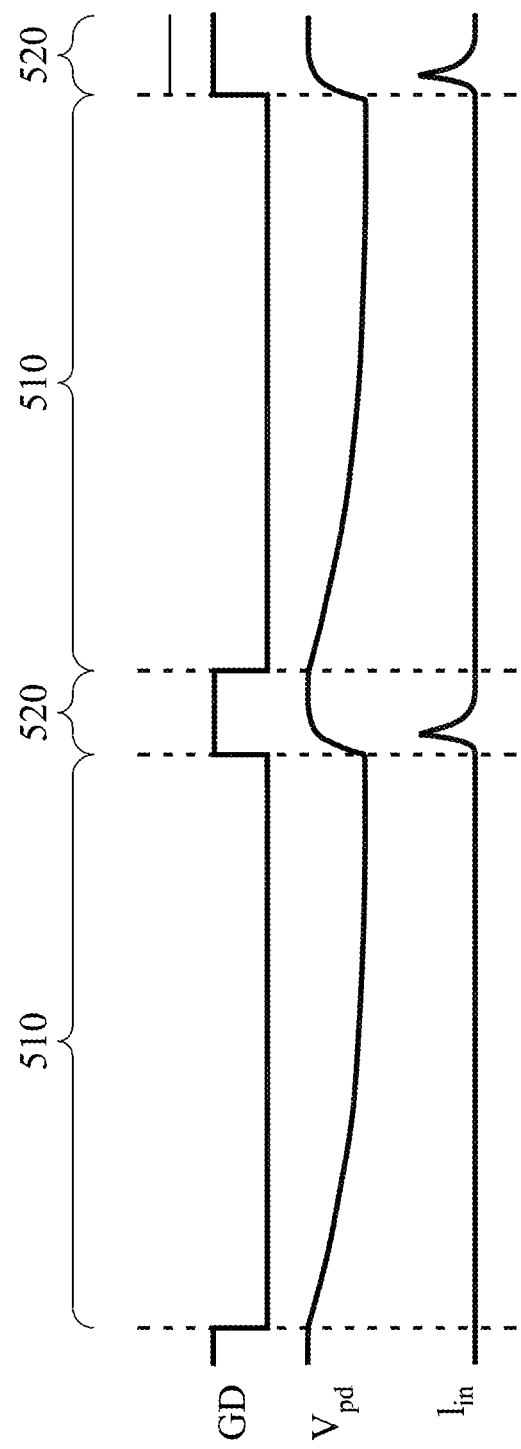
FIG. 5 is a timing diagram of signals of the fingerprint sensing circuit in accordance with an embodiment.

FIG. 5 is a timing diagram of signals of the fingerprint sensing circuit in accordance with an embodiment. Referring to FIG. 4 and FIG. 5, in an exposure period 510, the signal GD is at the low voltage, and hence the first switch SW1 and the second switch SW2 are turned off. The photo detector PD captures light reflected from the finger and generates a leakage current according to the intensity of the light. Meanwhile, the capacitor C is discharged, and the voltage $V_{pd}$ of the first terminal C-1 of the capacitor C drops gradually. The current mirror 410 is turned off because the first switch SW1 and second switch SW2 are turned off, and therefore the current $I_{in}$ of the output terminal 410-2 of the current mirror 410 is equal to zero.

In a sensing period 520, the signal GD is at the high voltage, and hence the first switch SW1 and the second switch SW2 are turned on so as to turn on the current mirror 410. The system voltage $V_{POW}$ charges the capacitor C, and the output terminal 410-2 of the current mirror 410 generates the current $I_{in}$ which is greater than zero. The voltage $V_{pd}$ raises until it is equal to $V_{POW}-V_{th}$ where $V_{th}$ is a threshold voltage of the transistor M1. The aforementioned bias voltage $V_{bias}$ is lower than $V_{POW}-V_{th}$. In some embodiments, the bias voltage $V_{bias}$ is negative. When the voltage $V_{pd}$ is equal to $V_{POW}-V_{th}$, the transistor M1 is turned off, and hence the current mirror 410 is turned off. The detecting circuit generates a fingerprint signal according to the current $I_{in}$. In detail, the integrating circuit 420 integrates the current $I_{in}$ to generate a voltage for the analog-to-digital converter 430 which outputs a fingerprint signal representing the intensity of the light. After all of the fingerprint sensing circuits perform the sensing, the corresponding fingerprint signals are used to generate a fingerprint image for recognition.

Figure 6:
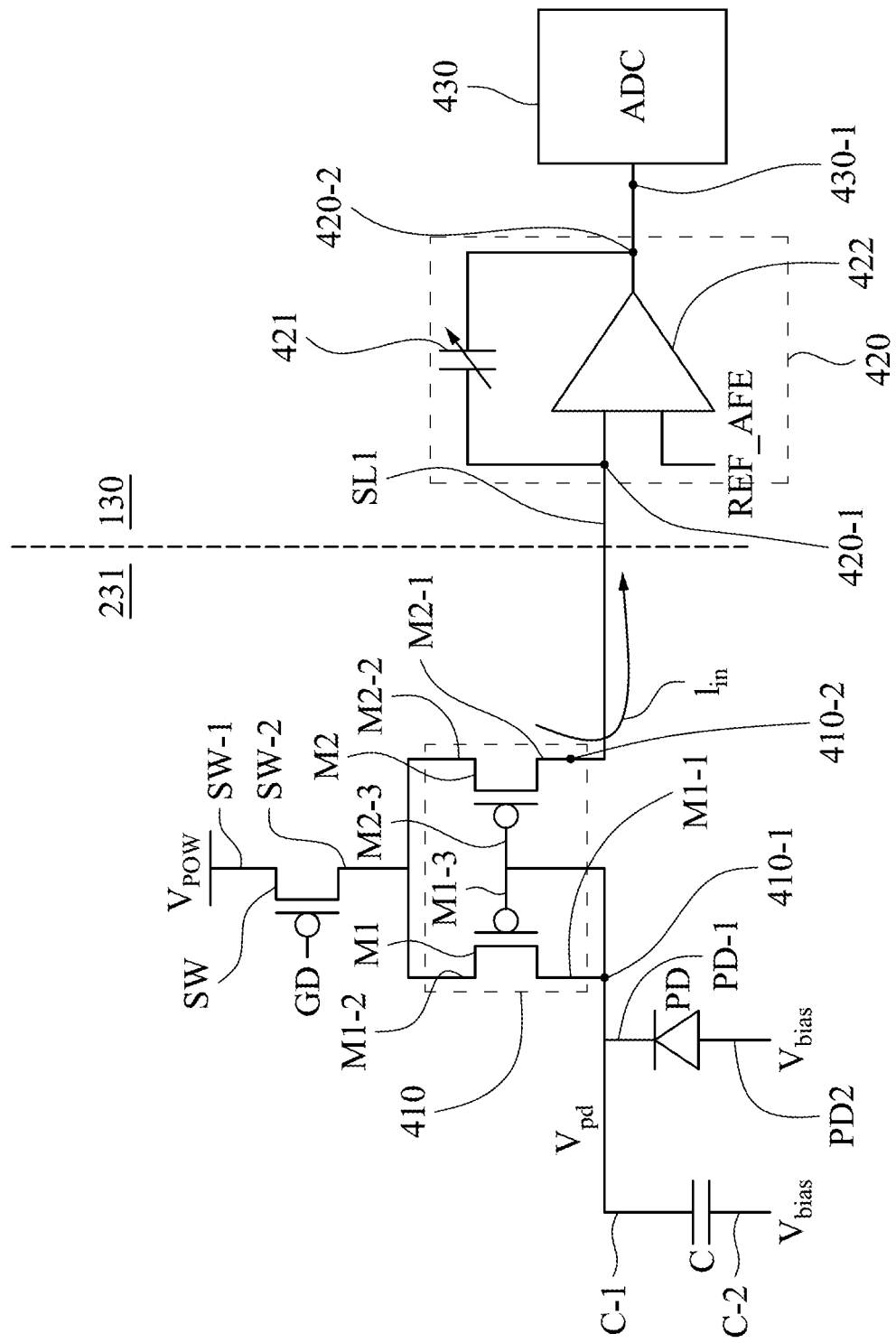
FIG. 6 is a circuit diagram of the fingerprint sensing circuit in accordance with another embodiment.
Figure 7:
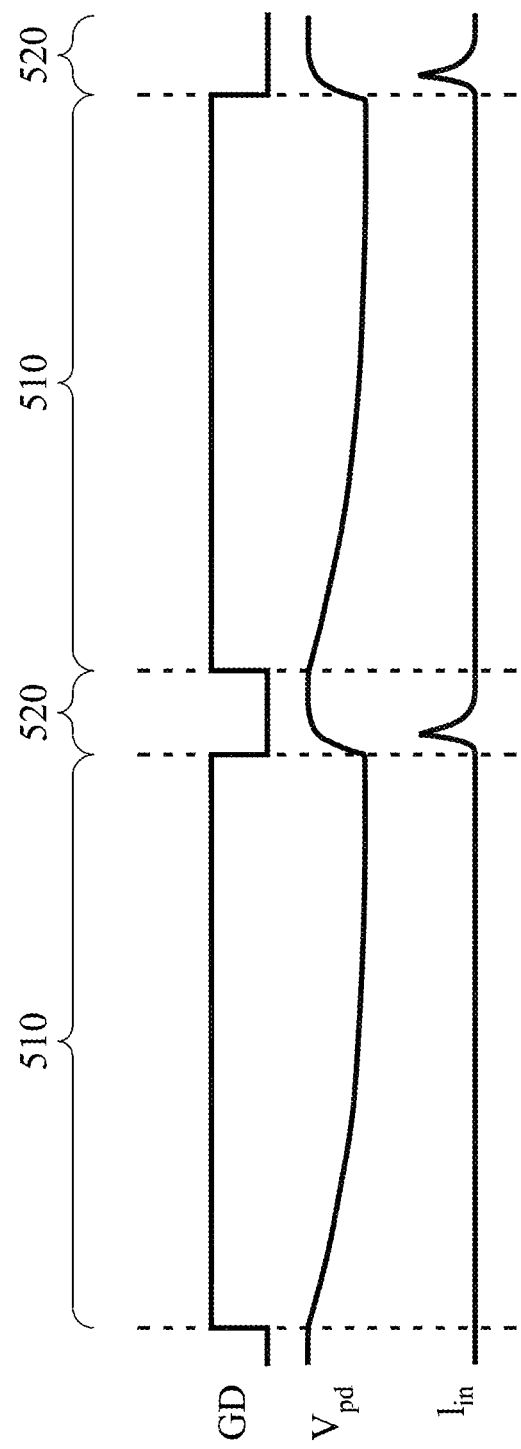
FIG. 7 is a timing diagram of the signals of FIG. 6.

FIG. 6 is a circuit diagram of the fingerprint sensing circuit in accordance with another embodiment. FIG. 7 is a timing diagram of the signals of FIG. 6. Referring to FIG. 6 and FIG. 7, the difference between FIG. 6 and FIG. 4 is that the switch circuit includes only one switch SW in FIG. 4. The switch SW has a first terminal SW-1 electrically connected to the system voltage $V_{POW}$ and a second terminal SW-2 electrically connected to the second terminal M1-2 of the transistor M1 and the second terminal M2-2 of the transistor M2. The switch SW is controlled by the signal GD. In the exposure period 510, the signal GD is at the high voltage, the switch SW is turned off, the current mirror 410 is turned off, and the current $I_{in}$ is equal to zero. In the sensing period 520, the signal GD is at the low voltage, the switch SW is turned on, the system voltage $V_{POW}$ charges the capacitor C, the output terminal 410-2 of the current mirror 410 generates the current $I_{in}$. The remaining operation is identical to that of FIG. 4 and therefore will not be repeated herein.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device comprising:
  a detecting circuit; and
  a display panel comprising a plurality of pixel units and a plurality of fingerprint sensing circuits, wherein each of the fingerprint sensing circuits corresponds to at least one of the pixel units, electrically connected to the detecting circuit through a sensing line, and comprises:
    a photo detector having a first terminal and a second terminal;
    a capacitor having a first terminal electrically connected to the first terminal of the photo detector;
    a current mirror having an input terminal electrically connected to the first terminal of the photo detector and an output terminal electrically connected to the sensing line; and
    a switch circuit configured to control the current mirror,
  wherein in an exposure period, the switch circuit is configured to turn off the current mirror,
  wherein in a sensing period, the switch circuit is configured to turn on the current mirror to generate a current on the sensing line, and the detecting circuit is configured to generate a fingerprint signal according to the current.

2. The display device of claim 1, wherein the current mirror comprises:
  a first transistor having a first terminal electrically connected to a control terminal of the first transistor and the input terminal of the current mirror; and
  a second transistor having a first terminal electrically connected to the output terminal of the current mirror, wherein a control terminal of the second transistor is electrically connected to the control terminal of the first transistor, and a second terminal of the second transistor is electrically connected to a second terminal of the first transistor and a system voltage.

3. The display device of claim 2, wherein the switch circuit comprises:
  a first switch having a first terminal electrically connected to the input terminal of the current mirror and a second terminal electrically connected to the first terminal of the photo detector; and
  a second switch having a first terminal electrically connected to the output terminal of the current mirror and a second terminal electrically connected to the sensing line.

4. The display device of claim 2, wherein the switch circuit comprises a switch having a first terminal electrically connected to the system voltage and a second terminal electrically connected to the second terminal of the first transistor and the second terminal of the second transistor.

5. The display device of claim 2, wherein the second terminal of the photo detector is electrically connected to a bias voltage, and a second terminal of the capacitor is electrically connected to the bias voltage.

6. The display device of claim 5, wherein the bias voltage is lower than the system voltage minus a threshold voltage of the first transistor.

7. The display device of claim 1, wherein the detecting circuit comprises:

an integrating circuit having an input terminal electrically connected to the sensing line; and an analog-to-digital converter having an input terminal electrically connected to an output terminal of the integrating circuit.

8. The display device of claim 1, wherein the display panel further comprises a plurality of color filters corresponding to the pixel units respectively, wherein the color filters do not cover the photo detector of each of the fingerprint sensing circuits.

9. The display device of claim 1, wherein the photo detector is a photo diode.

10. A fingerprint sensing circuit disposed in a display panel and corresponding to at least one pixel unit of the display panel, wherein the display panel comprises a sensing line electrically connected to a detecting circuit, the fingerprint sensing circuit comprises:

a photo detector having a first terminal and a second terminal;

a capacitor having a first terminal electrically connected to the first terminal of the photo detector;

a current mirror having a input terminal electrically connected to the first terminal of the photo detector and an output terminal electrically connected to the sensing line; and a switch circuit configured to control the current mirror, wherein in an exposure period, the switch circuit is configured to turn off the current mirror, wherein in a sensing period, the switch circuit is configured to turn on the current mirror to generate a current on the sensing line, and the detecting circuit is configured to generate a fingerprint signal according to the current.

11. The fingerprint sensing circuit of claim 10, wherein the current mirror comprises:

a first transistor having a first terminal electrically connected to a control terminal of the first transistor and the input terminal of the current mirror; and a second transistor having a first terminal electrically connected to the output terminal of the current mirror, wherein a control terminal of the second transistor is electrically connected to the control terminal of the first transistor, and a second terminal of the second transistor is electrically connected to a second terminal of the first transistor and a system voltage.

12. The fingerprint sensing circuit of claim 11, wherein the switch circuit comprises:

a first switch having a first terminal electrically connected to the input terminal of the current mirror and a second terminal electrically connected to the first terminal of the photo detector; and a second switch having a first terminal electrically connected to the output terminal of the current mirror and a second terminal electrically connected to the sensing line.

13. The fingerprint sensing circuit of claim 11, wherein the switch circuit comprises a switch having a first terminal electrically connected to the system voltage and a second terminal electrically connected to the second terminal of the first transistor and the second terminal of the second transistor.

14. The fingerprint sensing circuit of claim 11, wherein the second terminal of the photo detector is electrically connected to a bias voltage, and a second terminal of the capacitor is electrically connected to the bias voltage which is lower than the system voltage minus a threshold voltage of the first transistor.

15. The fingerprint sensing circuit of claim 11, wherein the photo detector is a photo diode.

* * * * *